UNITED STATES PATENT OFFICE.

LEWIS S. FILBERT, OF PHILADELPHIA, PENNSYLVANIA.

IMPROVEMENT IN COMPOSITIONS FOR PAVEMENTS.

Specification forming part of Letters Patent No. 120,956, dated November 14, 1871.

*To all whom it may concern:*

Be it known that I, LEWIS S. FILBERT, of Philadelphia, in the county of Philadelphia and in the State of Pennsylvania, have invented certain new and useful Improvements in Composition for Pavements; and do hereby declare that the following is a full, clear, and exact description thereof.

My present invention is intended as an improvement upon the pavement for which Letters Patent were granted to me October 25, 1870; and it consists in coating the composition therein described with Rosendale, hydraulic, or other cement and cutting the same into flaggings, as will be hereinafter more fully set forth.

In order to enable others skilled in the art to which my invention appertains to make and use the same, I will now proceed to describe it.

My composition is composed of the following ingredients, in about the following proportions: Eighty pounds asphalt; thirty pounds rosin, pitch, coal-tar, pine-tar, or dead oil; five pounds sulphuric acid or sulphur; ninety pounds lime; six hundred pounds sand, fine gravel, ground iron-cinder, and broken stone or slag; a suitable quantity of Rosendale, hydraulic, or other cement; and in some cases I may use one hundred and ninety pounds coal-ashes. The sand, gravel, cinder, stone, and slag, with the ashes, are first mixed and heated until dry, when the lime, asphalt, rosin, and acid or sulphur are added and boiled to a suitable consistency by any means. The mixed compound is then spread upon the ground previously prepared to receive it and rolled by heated or other rollers. Upon this I then put a coating of Rosendale, hydraulic, or other cement for the purpose of giving it color and adding to its durability. This cement is put on cold while the base is hot or warm. The heat of the base heats and dries the cement, giving it a beautiful finish. As soon as the cement is cold it is swept off with a wet broom, and while the base is yet hot the entire pavement is cut into flaggings of any size or shape, so as to prevent cracking by the contraction and expansion of the material.

I do not confine myself to the exact proportions of the ingredients herein mentioned, as the same may be varied according to the climate in or the purpose for which the compound is to be used.

Having thus fully described my invention, what I claim as new, and desire to secure by Letters Patent, is—

The improved composition for pavements and other purposes, constructed substantially as above described and set forth.

In testimony that I claim the foregoing I have hereunto set my hand this 30th day of August, 1871.

L. S. FILBERT.

Witnesses:
C. L. EVERT,
A. N. MARR.

(110)